(12) United States Patent
Sohma

(10) Patent No.: US 12,444,216 B2
(45) Date of Patent: Oct. 14, 2025

(54) IMAGE PROCESSING APPARATUS THAT OBTAINS ITEM VALUE AND PERFORMS CHARACTER RECOGNITION PROCESS ON A DOCUMENT IMAGE, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Hidetomo Sohma, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 349 days.

(21) Appl. No.: 18/050,400

(22) Filed: Oct. 27, 2022

(65) Prior Publication Data
US 2023/0140357 A1    May 4, 2023

(30) Foreign Application Priority Data
Oct. 29, 2021 (JP) .................. 2021-177090

(51) Int. Cl.
*G06V 30/14* (2022.01)
*G06V 30/413* (2022.01)
*G06V 30/416* (2022.01)
*G06V 10/40* (2022.01)
*G06V 30/148* (2022.01)

(52) U.S. Cl.
CPC ........ *G06V 30/1452* (2022.01); *G06V 30/413* (2022.01); *G06V 30/416* (2022.01); *G06V 10/40* (2022.01); *G06V 30/158* (2022.01)

(58) Field of Classification Search
None
See application file for complete search history.

(56) References Cited

U.S. PATENT DOCUMENTS

| 9,607,237 | B2* | 3/2017 | Wada | G06T 11/203 |
|---|---|---|---|---|
| 2007/0189612 | A1* | 8/2007 | Takahashi | G06V 20/63 |
| | | | | 382/229 |
| 2011/0029443 | A1* | 2/2011 | King | H04N 1/00875 |
| | | | | 358/1.18 |
| 2012/0008174 | A1* | 1/2012 | Sohma | G06V 30/422 |
| | | | | 358/448 |
| 2012/0008864 | A1* | 1/2012 | Kanatsu | G06V 30/412 |
| | | | | 382/176 |
| 2016/0188859 | A1* | 6/2016 | Lee | G06F 21/32 |
| | | | | 726/18 |
| 2021/0409550 | A1* | 12/2021 | Toda | G06V 30/414 |

FOREIGN PATENT DOCUMENTS

JP        2017174309 A        9/2017

* cited by examiner

*Primary Examiner* — Haris Sabah
(74) *Attorney, Agent, or Firm* — Canon U.S.A., Inc. IP Division

(57) ABSTRACT

An image processing apparatus acquires a character recognition result by performing character recognition processing on a document image, detects a character string candidate described in a predetermined format from the character recognition result, determines a likelihood of the character string candidate based on another character string existing in the vicinity of the detected character string candidate, and outputs, in a case where a plurality of character string candidates is detected, an item value based on a character string candidate having a high likelihood.

9 Claims, 13 Drawing Sheets

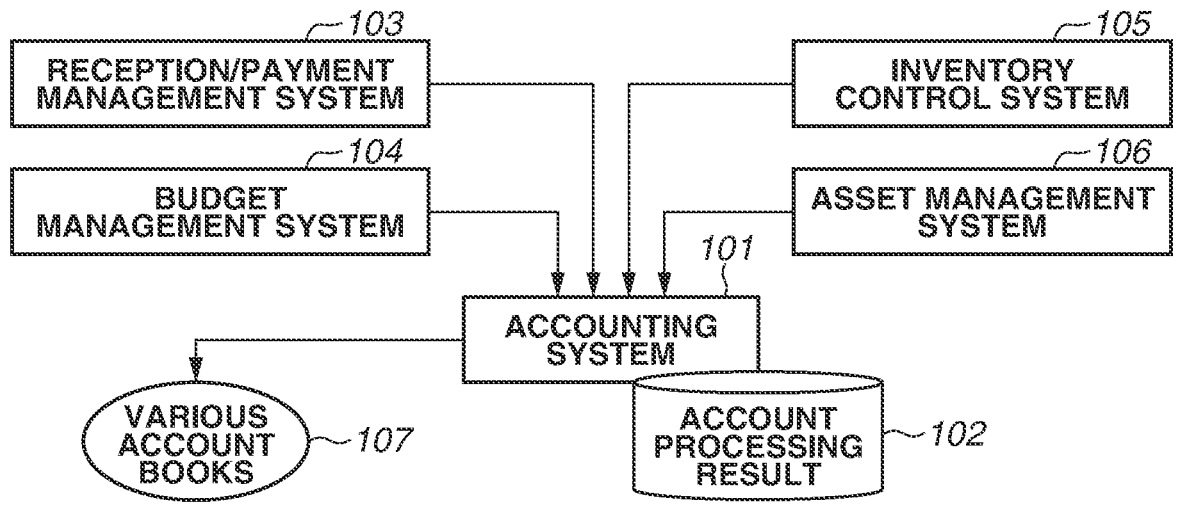

FIG. 1C

| DATE | DEBTOR [CODE] | SECTION [CODE] | AMOUNT OF MONEY (INCLUDING TAX) | REMARKS | CREDITOR [CODE] | SECTION [CODE] | AMOUNT OF MONEY (INCLUDING TAX) |
|---|---|---|---|---|---|---|---|
| ... | ... | ... | ... | ... | ... | ... | ... |
| NOV. 12, 2020 | STATIONERY COST [300] | KAMATA BRANCH [221] | 7,700 | AAA OFFICE MACHINES, INC. | CASH [100] | KAMATA BRANCH [221] | 7,700 |
| | | | | | | | |

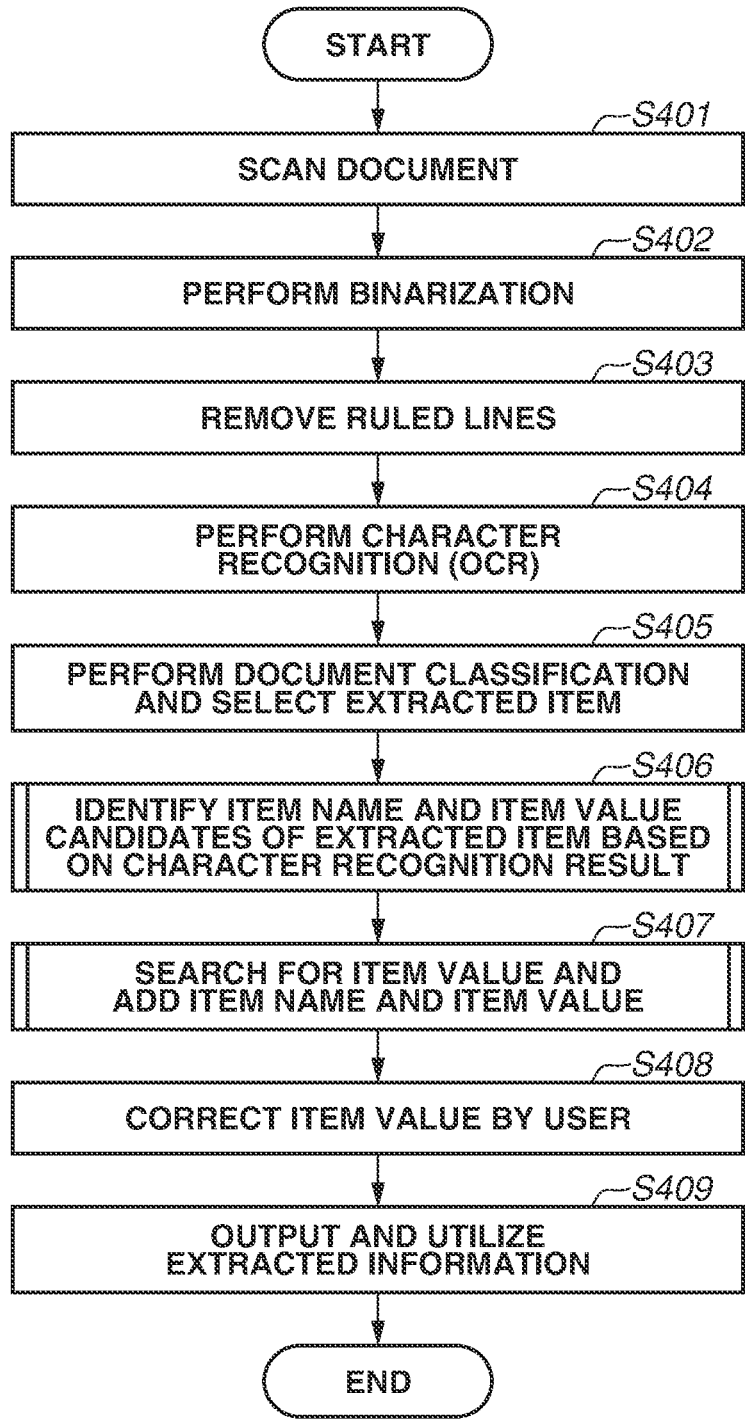

FIG.5A

| CHARACTER RECOGNITION RESULT ID | POSITION AND SIZE IN DOCUMENT IMAGE | CHARACTER RECOGNITION RESULT (MAXIMUM LIKELIHOOD CANDIDATE CHARACTER STRING) |
|---|---|---|
| T1 | (10, 100) - (16, 68) | RECEIPT |
| T2 | (32, 10) - (12, 106) | DATE OF ISSUE: NOV. 12, 2020 |
| T3 | (30, 160) - (12, 60) | AAA OFFICE MACHINES, INC. |
| T4 | (40, 150) - (12, 60) | 141-0001 |
| T5 | (50, 150) - (12, 60) | OTA-KU, TOKYO |
| T6 | (70, 150) - (12, 60) | PHONE: 03-1234-5678 |
| T7 | (70, 10) - (10, 100) | BBB CO., LTD. |
| T8 | (118, 16) - (12, 76) | TOTAL AMOUNT: 7,700 YEN |
| ... | ... | ... |
| T10 | (124, 12) - (12, 102) | BALL-POINT PEN (AB045-555-1234) |
| ... | ... | ... |

FIG.5B

| EXTRACTED ITEM ID | EXTRACTED ITEM NAME | ITEM NAME RESTRICTION | ITEM VALUE RESTRICTION | RELATIONAL RESTRICTION |
|---|---|---|---|---|
| E1 | DATE | "DATE OF ISSUE" "DATE OF PAYMENT" | [0-9]+YEAR[0-9]+ MONTH[0-9]+DAY | RIGHT ({ITEM NAME}, {ITEM VALUE}) |
| E2 | TELEPHONE NUMBER | "TELEPHONE NUMBER" "PHONE" | [0-9]+\-[0-9]+ \-[0-9]+ | RIGHT ({ITEM NAME}, {ITEM VALUE}), {ITEM VALUE}≠(UPPER) |
| E3 | TOTAL AMOUNT | "TOTAL AMOUNT" | [0-9]+\,[0-9]+YEN? | RIGHT ({ITEM NAME}, {ITEM VALUE}) |

FIG.5C

| ITEM NAME CANDIDATE ID | EXTRACTED ITEM ID | CHARACTER RECOGNITION RESULT ID | POSITION AND SIZE IN DOCUMENT IMAGE | CHARACTER RECOGNITION RESULT OF ITEM NAME (MAXIMUM LIKELIHOOD CANDIDATE CHARACTER STRING) |
|---|---|---|---|---|
| K1 | E1 | T2 | (32, 10) - (12, 26) | DATE OF ISSUE |
| K2 | E2 | T6 | (70, 150) - (12, 14) | PHONE |
| K3 | E3 | T8 | (118, 16) - (12, 40) | TOTAL AMOUNT |

FIG.5D

| ITEM VALUE CANDIDATE ID | EXTRACTED ITEM ID | CHARACTER RECOGNITION RESULT ID | POSITION AND SIZE IN DOCUMENT IMAGE | CHARACTER RECOGNITION RESULT OF ITEM NAME (MAXIMUM LIKELIHOOD CANDIDATE CHARACTER STRING) |
|---|---|---|---|---|
| V1 | E1 | T2 | (32, 40) - (12, 76) | NOV. 12, 2020 |
| V2 | E2 | T6 | (70, 170) - (12, 60) | 03-1234-5678 |
| V3 | E2 | T10 | (124, 26) - (12, 60) | 045-555-1234 |
| V4 | E3 | T8 | (118, 60) - (12, 40) | 7,700 YEN |

FIG.7

| EXTRACTED ITEM ID | USED RELATIONAL RESTRICTION | ITEM VALUE CANDIDATE ID | ITEM NAME CANDIDATE ID | ITEM VALUE LIKELIHOOD |
|---|---|---|---|---|
| E1 | RIGHT({ITEM NAME}, {ITEM VALUE}) | V1 | K1 | HIGH |
| E2 | RIGHT({ITEM NAME}, {ITEM VALUE}) | V2 | K2 | HIGH |
| E3 | {ITEM NAME}#(UPPER) | V3 | | MIDDLE |
| E4 | RIGHT({ITEM NAME}, {ITEM VALUE}) | V4 | K4 | HIGH |

FIG.9

| EXTRACTION RESULT ID | EXTRACTED ITEM ID | ITEM NAME CANDIDATE ID | ITEM VALUE CANDIDATE ID | ITEM VALUE LIKELIHOOD | ITEM VALUE |
|---|---|---|---|---|---|
| R1 | E1 | K1 | V1 | HIGH | NOV. 12, 2020 |
| R2 | E2 | K2 | V2 | HIGH | 03-1234-5678 |
| R3 | E2 | K3 | V3 | MIDDLE | 045-555-1234 |
| R4 | E3 | K4 | V4 | HIGH | 7,700 YEN |
| D1 | | | V2 | HIGH | AAA OFFICE MACHINES, INC. |

RECEIPT

*1102* — DATE OF ISSUE: NOV. 12, 2020

*1103* — AAA OFFICE MACHINES, INC.
141-0001
OTA-KU, TOKYO
03-1234-5678

*1104* — BBB CO., LTD.

*1105* — TOTAL AMOUNT: 7,700 YEN

| NAME OF ARTICLE | UNIT PRICE | QUANTITY | PRICE |
|---|---|---|---|
| BALL-POINT PEN (AB045-555-1234) | 100 | 20 | 2,000 |
| COPY PAPER (500 SHEETS: PB-345) | 1,000 | 5 | 5,000 |
| SUBTOTAL | | | 7,000 |
| CONSUMPTION TAX (10%) | | | 700 |
| SUM TOTAL | | | 7,700 |

*1106* points to the article rows. *1107* points to the subtotal/tax rows.

FIG. 11B

| EXTRACTED ITEM ID | EXTRACTED ITEM NAME | ITEM NAME RESTRICTION | ITEM VALUE RESTRICTION | ITEM REFERENCE RESTRICTION | RELATIONAL RESTRICTION |
|---|---|---|---|---|---|
| E1 | DATE | "DATE OF ISSUE" "DATE OF PAYMENT" | [0-9]+YEAR[0-9]+ MONTH[0-9]+DAY | | RIGHT ({ITEM NAME}, {ITEM VALUE}) |
| E2 | TELEPHONE NUMBER | "TELEPHONE NUMBER" "PHONE" | [0-9]+-[0-9]+ -[0-9]+ | /CORPORATE STATUS EXPRESSION/ /ADDRESS EXPRESSION/ | RIGHT ({ITEM NAME}, {ITEM VALUE}), NEIGHBORHOOD({ITEM REFERENCE}, {ITEM VALUE}), {ITEM VALUE}.#(UPPER) |
| E3 | TOTAL AMOUNT | "TOTAL AMOUNT" | [0-9]+,[0-9]+YEN? | | RIGHT ({ITEM NAME}, {ITEM VALUE}) |

FIG. 11C

| ITEM REFERENCE ID | EXTRACTED ITEM ID | CHARACTER RECOGNITION RESULT ID | ITEM REFERENCE RESTRICTION | POSITION AND SIZE IN DOCUMENT IMAGE | CHARACTER RECOGNITION RESULT OF ITEM REFERENCE (MAXIMUM LIKELIHOOD CANDIDATE CHARACTER STRING) |
|---|---|---|---|---|---|
| B1 | E2 | T3 | /CORPORATE STATUS EXPRESSION/ | (32, 200) - (12, 10) | INC. |
| B2 | E2 | T5 | /ADDRESS EXPRESSION/ | (60, 150) - (12, 124) | OTA-KU, TOKYO |
| B3 | E2 | T7 | /CORPORATE STATUS EXPRESSION/ | (70, 24) - (10, 60) | CO., LTD. |

FIG. 11D

| EXTRACTION RESULT ID | EXTRACTED ITEM ID | ITEM NAME CANDIDATE ID | ITEM VALUE CANDIDATE ID | ITEM VALUE LIKELIHOOD | ITEM VALUE |
|---|---|---|---|---|---|
| R1 | E1 | K1 | V1 | HIGH | NOV. 12, 2020 |
| R2 | E2 | K2 | V2 | MIDDLE | 03-1234-5678 |
| R3 | E2 | K3 | V3 | LOW | 045-555-1234 |
| R4 | E2 | K4 | V4 | HIGH | 7,700 YEN |
| D1 | E3 | | V2 | MIDDLE | AAA OFFICE MACHINES, INC. |

IMAGE PROCESSING APPARATUS THAT OBTAINS ITEM VALUE AND PERFORMS CHARACTER RECOGNITION PROCESS ON A DOCUMENT IMAGE, IMAGE PROCESSING METHOD, AND NON-TRANSITORY COMPUTER-READABLE STORAGE MEDIUM

BACKGROUND

Field

The present disclosure relates to an image processing apparatus that obtains an item value for a predetermined item, an image processing method, and a non-transitory storage medium.

Description of the Related Art

In recent years, it has become a common practice to generate electronic data by scanning a document by using an image scanner provided on a Multi-Function Printer (MFP) having printing, copy, and facsimile functions. It has also become common to generate electronic data by capturing an image of a document by using a digital camera or a camera function of a mobile device represented by a smart phone. It has become easy to obtain a document image (scanned document image) by optically scanning or capturing an image of a document including handwritten characters and printed characters. Further, by subjecting this document image to optical character recognition processing (OCR processing), a text image in the document image can be converted into computer-readable character codes. The use of such character recognition processing has facilitated automation of tasks of converting paper forms such as receipts and bills into digital data and entering the data in a system (e.g., expense reimbursement work). Thus, the productivity in data entry work is expected to be improved.

Japanese Patent Application Laid-Open No. 2017-174309 discusses a technique for prompting the user, when a plurality of telephone numbers is obtained in extracting a telephone number from a document image, to select a desired telephone number from the plurality of telephone numbers.

According to the technique discussed in Japanese Patent Application Laid-Open No. 2017-174309, however, the phone numbers presented to the user include numbers incorrectly extracted as telephone numbers, so that the user needs to check all of the numbers.

SUMMARY

According to an aspect of the present disclosure, an image processing apparatus includes a memory that stores instructions, and a processor that executes the instructions to perform: acquiring a character recognition result by performing character recognition processing on a document image, detecting a character string candidate described in a predetermined format from the character recognition result, determining a likelihood of the character string candidate based on another character string existing in the vicinity of the detected character string candidate, and outputting, in a case where a plurality of character string candidates is detected, an item value based on a character string candidate having a high likelihood.

Further features of the present disclosure will become apparent from the following description of exemplary embodiments with reference to the attached drawings.

BRIEF DESCRIPTION OF THE DRAWINGS

FIGS. 1A, 1B, and 1C illustrate an overview processing in accounting work, a document image example, and an example of content input in the processing.

FIG. 4 illustrates a flow of overall processing according to one or more aspects of the present disclosure.

FIGS. 5A to 5D illustrate examples of a character recognition result and item information according to one or more aspects of the present.

FIG. 7 illustrates an example of a result of the item value extraction processing according to one or more aspects of the present disclosure.

FIG. 9 illustrates a result of processing including a result of the telephone number search processing according to one or more aspects of the present disclosure.

FIGS. 11A, 11B, 11C, and 11D illustrate a second exemplary embodiment.

DESCRIPTION OF THE EMBODIMENTS

Figure 2:
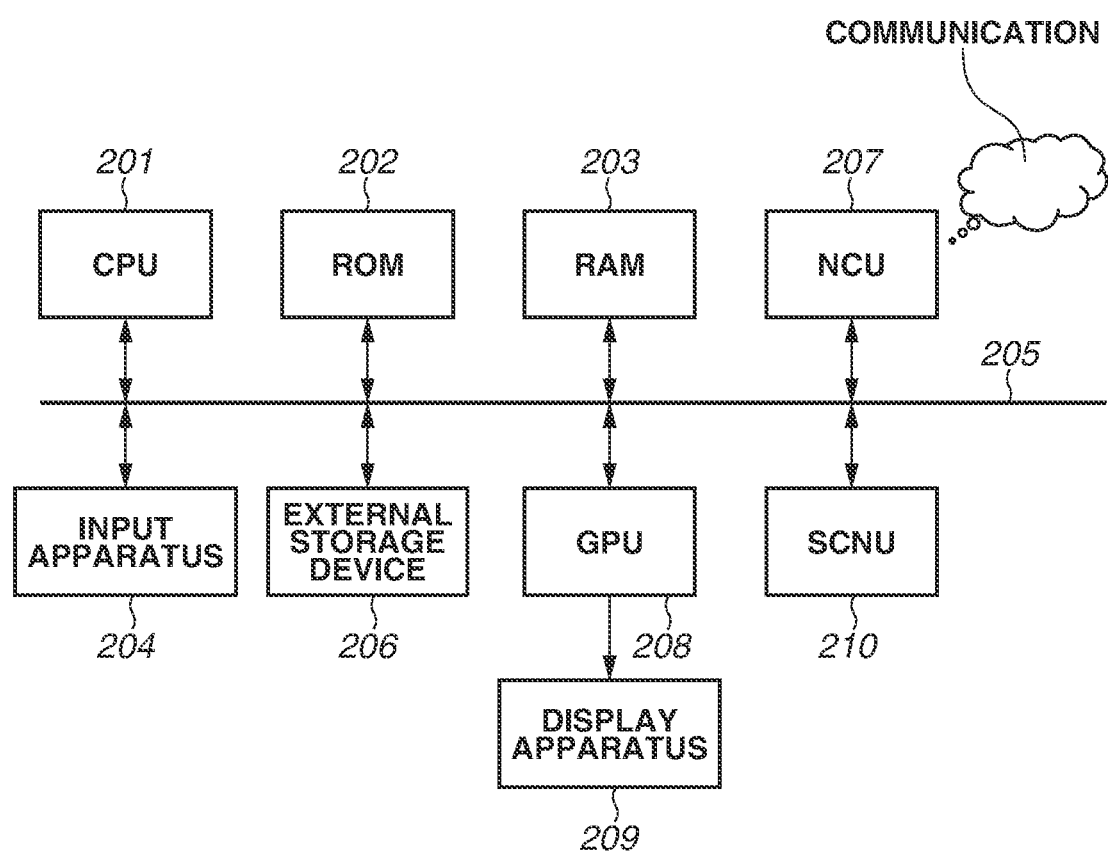
FIG. 2 illustrates a system configuration according to one or more aspects of the present disclosure.

A first exemplary embodiment will be described below. FIG. 1A illustrates a flow of information between an accounting system and various systems that operate with the accounting system.

An accounting system 101 is a system that assists accounting work. The accounting system 101 is a system that records transactions of cash, deposits, assets, and commodity goods or products of the company while classifying them from the management or tax viewpoint, and the accounting system 101 records data on various account books in an electronic form. The recorded contents are stored as an account processing result 102 and output as various account books 107 as appropriate. The accounting system 101 needs to classify each expense item according to the content and purpose at the time of transaction, and thus uses an expense item code to recognize each expense item.

The various systems that operates with the accounting system 101 include a reception/payment management system 103 for managing cash and deposits, a budget management system 104 for managing the budget of each section, an inventory control system 105 for managing the commodity inventory, and an asset management system 106 for managing various assets. When a cash, deposit, asset, or commodity transaction is to be conducted, the amount of increase and decrease in the cash, deposits, assets or commodities is recorded in the management system 103, 105, or 106.

Conventionally, the person in charge of accounting records data in the accounting system 101 with reference to information on each transaction recorded in the management systems 103, 105, and 106. In managing the budget, the budget management system 104 uses a budget code for identifying each budget.

FIG. 1B illustrates a form document 110 as an example of a receipt (form document) issued when stationery is purchased. This receipt is an evidenced document that proves the purchase of the stationery. Various information is described in portions of the form document 110. For example, a document title 111 is a portion indicating the title of the form document 110 and indicates that the form document 110 is a "receipt". A date of issue 112 indicates the date on which the form document 110 is issued. In the accounting work, to store this receipt, i.e., the form document 110, as an evidenced document, information about the date "Nov. 12, 2020" as the date of issue 112 may be used to identify the form document 110.

An issuer 113 describes information about the company (issuer) that has made and issued the form document 110, including the company name, address, and telephone number. When subjecting a received form to account processing, it is necessary to clarify what has been purchased for what purpose to classify the expense item. To do so, information about "AAA Office Machines" which is the company name of the issuer 113 may be used. When the receipt that is the form document 110 is stored as an evidenced document, the information about the company name may be used to identify the form document 110.

An addressee 114 describes the name of the company that has purchased and paid for the articles. A total amount 115 describes the total amount of the purchase and payment. When subjecting the form document to account processing, this amount of money (and the amount of tax as required) will be used as the amount of transaction. A detail 116 describes the detailed information about the amount billed, i.e., information about the unit price, quantity, and price for each article. A total 117 indicates the subtotal of prices, tax information, and the total amount 115 that is given by adding the tax information to the subtotal of prices.

FIG. 1C illustrates is an example of account book information to be recorded in the accounting system 101. A transaction record 120 on an account book describes transactions to be used for accounting in the account book format, and the transactions are recorded in tabular form. In this table, each row corresponds to one transaction. Information for each transaction is recorded in the table, starting with the date of transaction.

An example where transaction information on a certain section (department) is recorded will be described below. For example, as the budget of the section, the content of stationery to be purchased for the use in office work and the amount to be paid are allocated in advance and recorded in the budget management system 104. As the purchase content describes, the section purchases stationery from the company with the company name "AAA Office Machines" on "Nov. 12, 2020" and pays for the stationery in cash from the reception/payment management system 103.

In this case, it is necessary to record that the amount of money for the purchase has been spent. In this case, the company "AAA Office Machines" has issued the receipt (form document) 110 as an evidenced document, and the section has obtained the receipt (form document) 110 to prove the purchase and payment. In this case, in the transaction record 120 on the account book, the column "Creditor" and the following two columns (6th to 8th columns from left) describe the following content. These columns describe "Cash" and the classification code "100" in the expense record of the reception/payment management system 103, the section name "Kamata Branch" and the budget code "221" as budget information from the budget management system 104, and the amount of payment "7,700" yen. Further, in the transaction record 120 on the account book, the column "Debtor" and the following two columns (2nd to 4th columns from left) describe the following content. These columns describe that "Kamata Branch" paid "7,700" yen as a stationery cost. Therefore, the person in charge of accounting records the expense item "Stationery Cost" and the expense item code "300" in the "Debtor" column, the section name "Kamata Branch" and the budget code "221" in the "Section" column, and "7,700" yen in the "Amount" column. Further, as the ground of classification of the expense item, the person in charge of accounting records "AAA Office Machines" in the "Remarks" column to facilitate the association with the form document 110. With the above descriptions, each individual fact that cash has been withdrawn from the assets to purchase stationery based on the budget of a certain section can be recorded in an associated way as a transaction of the stationery cost. Conventionally, in recording the information, the person in charge of accounting has checked each individual fact including an evidenced document and classified each expense item in the accounting system 101. The account processing result 102 is the accumulation of such recorded content.

When performing the above-described work, a function of automatically transcribing the content described in the form document 110 (including the date, the amount of money, and the company name) to the accounting system 101 enables reduction in the work load on the person in charge of accounting. An example transcription will be considered below. An example is discussed below where a document such as an evidenced document is read as an electronic image by using an image scanner, the character recognition processing is executed on the image to extract the described information and transcribe the information to the accounting system 101.

In a case of extracting the described company name as information, the company name may be described on the receipt using a logo or a special font, or the company name may be described using a stamp and the text image may be blurred. In such a case, it may be difficult to extract the company name by using character recognition. The following method is used to deal with such an issue. Specifically, telephone number data is prepared and held in advance by digitalizing the telephone book so that a telephone number service is available. The telephone number of the company is extracted by character recognition, and the search for the telephone number is performed using the telephone number data and the telephone number service to obtain the company name. This method is effective particularly in a case where the accuracy of character recognition is high in recognition of numbers.

However, in fact, if a numerical string is simply extracted as a phone number of the company from the result of character recognition, there may be a case where a plurality of phone numbers is described or a case where a numerical string similar to a phone number is extracted as a phone number. Accordingly a plurality of phone numbers including a numerical string erroneously recognized as a phone number may be extracted. The present exemplary embodiment will be described below centering on an example where company name search is performed using a correct telephone number even when a plurality of telephone numbers is extracted from the document image.

FIG. 2 illustrates an overview of a system configuration of an image processing apparatus according to the present exemplary embodiment. A central processing unit (CPU) 201 implements control and processing of various systems according to the present exemplary embodiment. The contents of the control and processing are implemented when the CPU 201 executes programs stored in a read only memory (ROM) 202 or a random access memory (RAM) 203 (described below). In addition, a plurality of computer programs can be parallelly operated based on a function of the CPU 201 itself and the mechanism of a computer program.

The ROM 202 stores computer programs and data that store control procedures to be performed by the CPU 201. The RAM 203 provides a work area for temporarily storing computer programs to be executed by the CPU 201 and various data to be used by the CPU 201 to implement various control.

An input apparatus 204 includes a keyboard and a mouse that provide an environment for a user to perform various input operations. The input apparatus 204 may include a touch panel, a stylus pen and the like as long as it provides an environment for a user to perform various input operations, and the input operations may be performed using speech recognition or gesture operation.

A bus 205 is, for example, an address bus or a data bus connected to components in the internal configuration, and provides functions of information exchange and communication between these components, thereby enabling cooperative operation of the components.

An external storage device 206 for storing various data includes a recording medium such as a hard disk, flexible disk, optical disk, magnetic disk, magnetic tape, and non-volatile memory card, and a drive for driving the recording medium to record information. When necessary, a whole or part of the stored computer programs and data are called on the RAM 203 based on an instruction from the keyboard and instructions from various computer programs.

A communication apparatus Network Control Unit (NCU) 207 communicates with other computer apparatuses. The NCU 207 communicates with an apparatus (not illustrated) at a remote location via a Local Area Network (LAN), enabling the programs and data according to the present exemplary embodiment to be shared with the apparatus. Applicable communication means include wire-lined communications, such as Recommended Standard 232C (RS-232C), Universal Serial Bus (USB), Institute of Electrical and Electronics Engineers (IEEE)1394, P1284, Small Computer System Interface (SCSI), modem, and Ethernet, and wireless communications, such as Bluetooth, infrared communication, and IEEE802.11a/b/n.

A Graphics Processing Unit (GPU) 208 generates a display content image and calculates a display position according to a display instruction and a calculation instruction given via the CPU 201 and the bus 205, and transmits the calculation result to a display apparatus 209 for image drawing. Alternatively, the GPU 208 may return the calculation result to the CPU 201 via the bus 205 to perform calculation processing in collaboration with the CPU 201. The display apparatus 209 displays statuses of various input operations and calculation results corresponding to the statuses to the user.

A Scanner Unit (SCNU) 210 obtains a document image by reading a document. The SCNU 210 needs not necessarily be built in the image processing apparatus and may be connected thereto with a cable or connected thereto via a network by using a communication function of an external interface (I/F) such as the NCU 207.

The above-described configuration is merely an example, and the present disclosure is not limited to the configuration. The internal configuration and the components constituting the configuration are not limited to hardware configuration or components but may be virtually generated by software. In addition to a case where the above-described internal configuration is used on a standalone basis, there may be a case where a plurality of configurations in FIG. 2 is operated in a cooperative way to perform information exchange and sharing therebetween using the NCU 207 so as to configure systems such as servers and personal computer (PC) clients. More specifically, when a plurality of configurations is used, the configurations at different locations may operate in a cooperative way via a LAN or the Internet, or the components virtually generated by software may be included. There may be a method for sharing a configuration so that a whole or part of systems such as a plurality of servers and PC clients are operated on a single configuration the same as that illustrated in FIG. 2. For example, cloud computing can be used. In this case, a processing unit on the cloud receives a document image from an apparatus having a scanner function via a network and processes the document image.

Figure 3:
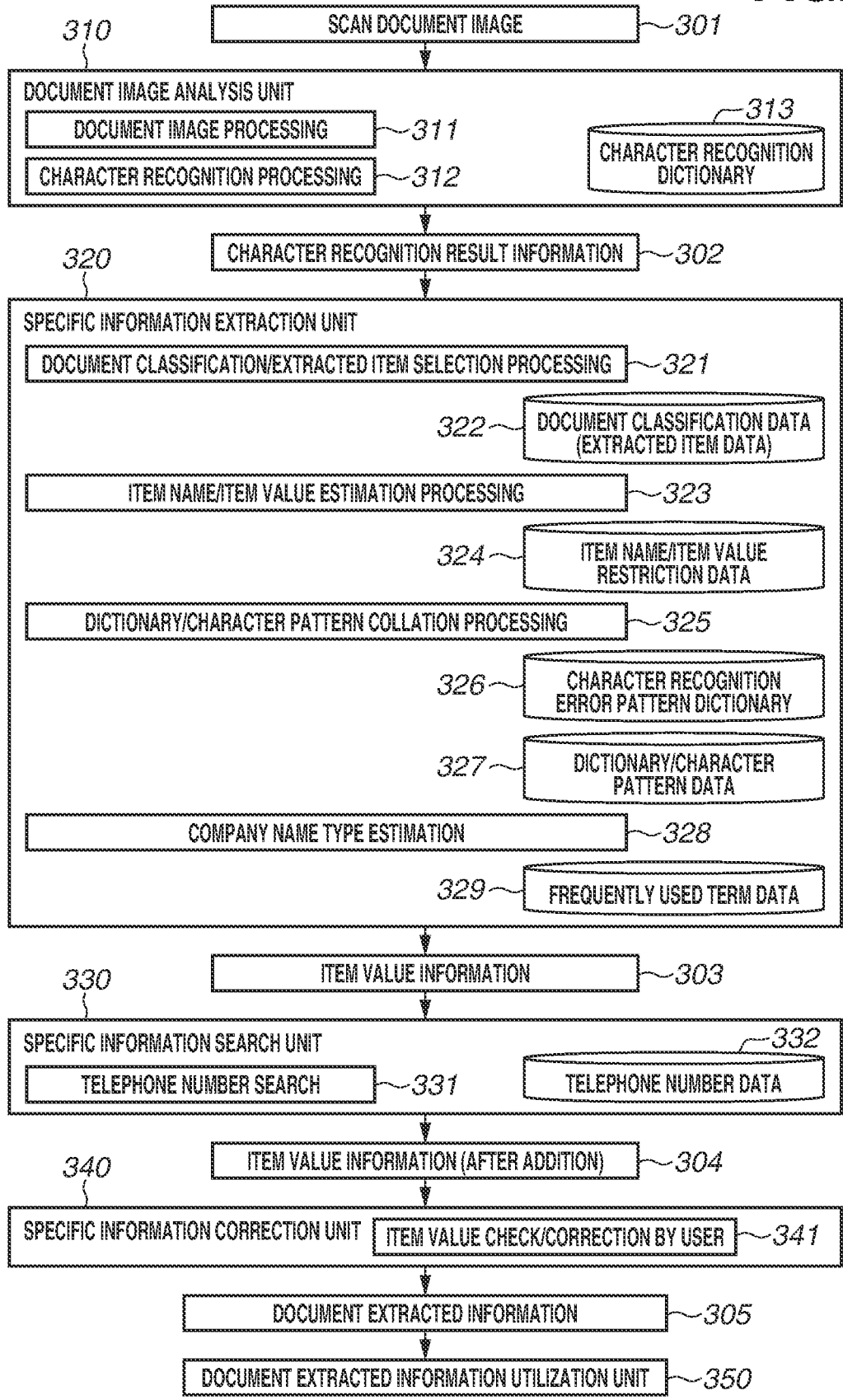
FIG. 3 illustrates an overview of a software configuration and a flow of information according to one or more aspects of the present disclosure.

FIG. 3 illustrates main functions performed by processing units of the image processing apparatus and an overall flow of information according to the present exemplary embodiment. Processing performed by the processing units in FIG. 3 is configured by processing programs and data stored in the external storage device 206 and the ROM 202. The processing is implemented when the programs and data are copied to the RAM 203 and then executed and accessed by the CPU 201 and the GPU 208. Various data and the character recognition dictionary in FIG. 3 are configured by data stored in the external storage device 206 and the ROM 202, and are copied to the RAM 203 and used as appropriate.

A scan document image 301 is image information that is obtained by optically scanning a document described or printed on a medium such as paper. The scan document image 301 is acquired when the SCNU 210 in FIG. 2 scans a document.

A document image analysis unit 310 is a functional unit that executes analysis processing on the scan document image 301 and extracts information about content described including text information and image information such as illustrations and photographs. The document image analysis unit 310 holds the following functions and information.

Document image processing 311 adjusts the density and color of the scan document image 301, binarizes the adjusted image for character recognition, and/or deletes an image corresponding to ruled line such as a matrix to make it easier to analyze the scan document image 301.

Character recognition processing 312 performs a search for a text image area in the result of processing by the document image processing 311 to obtain a text image, and obtaining a character code corresponding to the text image. A character recognition dictionary 313 is data to be used to determine a character code corresponding to the text image in the character recognition processing 312.

The character recognition processing 312 estimates the description direction of the character string by concatenating characters adjacent to each other to form a character string as the character recognition result. This character string as the character recognition result holds the description direction of the character string, area information about the position and size in the scan document image 301 for each character constituting the character string, and character code string information. This character code string includes a pair of the likelihood based on the similarity as a text image in character recognition and a character code. A character code of the maximum likelihood in the character code string is referred to as a maximum likelihood text. A character string including only the maximum likelihood text in the character string as the result of character recognition is referred to as a maximum likelihood candidate character string. The character recognition processing 312 can not only perform character recognition on the entire scan document image 301 but also perform character recognition only on a partial area in the image. The character recognition processing 312 can also perform character recognition even in a case where restrictions on characters, character types, language used, and description direction of a character string are applied.

Character recognition result information 302 includes the character string as the character recognition result output from the character recognition processing 312 and the image as the processing result of the document image processing 311.

A specific information extraction unit 320 executes analysis processing on the character recognition result information 302 to extract necessary information from the description content of the character recognition result information 302. The specific information extraction unit 320 holds the following functions and information.

Document classification/extracted item selection processing 321 performs document classification on the scan document image 301 based on the description content (character recognition result) in the character recognition result information 302 and the arrangement (layout) thereof in the document image. The document classification/extracted item selection processing 321 also determines extracted items as items of information to be extracted, according to the content of each document classification. For example, as document classification content, the document classification/extracted item selection processing 321 classifies the document into a receipt, bill, invoice, report, and estimate, and determines extracted items such as the total amount and the date according to the content of each document classification. Document classification data (extracted item data) 322 is data to be used by the document classification/extracted item selection processing 321 to perform document classification. This piece of data stores information about the description content of each document classification and the arrangement (layout) thereof in the document image, and information about extracted items determined by the content of each document classification.

Item name/item value estimation processing 323 searches for a character recognition result considered to be corresponding to the item value for each extracted item in the result of character recognition on the character recognition result information 302. Item name/item value restriction data 324 is information about restrictions to be used by the item name/item value estimate processing 323 to perform search processing. The item name/item value restriction data 324 records restrictions on the item name and item value including restrictions on the character recognition result, such as character types and terms, and restrictions on the absolute and relative positions (arrangements) thereof in the document image.

Dictionary/character pattern collation processing 325 corrects the character recognition result estimated to be an item name and an item value by using a character recognition error pattern dictionary 326 and dictionary/character pattern data 327 for the item values. The character recognition result information 302 includes character recognition errors since character recognition is affected by the scan document image 301, the deterioration of the original paper document itself, and the scan environment. The dictionary/character pattern collation processing 325 corrects the character recognition result as much as possible to improve the accuracy of the character recognition result for the item values. However, it is very difficult to make the character recognition result free from errors. Although the number of errors can be reduced, the character recognition result will include errors.

The character recognition error pattern dictionary 326 includes information about typical error patterns in character recognition. This information is generated in advance by causing the character recognition processing 312 and the character recognition result information 302 to perform character recognition using various sample data, and then comparing the character recognition results with the correct answer results. The dictionary/character pattern data 327 is information to be used to correct item values of extraction target items. In a case where the description content (character string) of the item value is known or predictable, a dictionary is generated in advance using collected information about the description content (character strings). Then, by using this information, the dictionary/character pattern collation processing 325 estimates description content corresponding to the character recognition result.

Further, in a case where the character string pattern of the description content of the item value is known or predictable, the character string pattern of the description content is generated in advance. Then, by using this information, the dictionary/character pattern collation processing 325 estimates description content corresponding to the character recognition result.

Company name type estimation 328 estimates a company name type (company classification type) related to the products and services provided by the company that has issued the target scan document image 301, based on the terms used in the character recognition result information 302. For example, the company name type estimation 328 outputs classification type information such as "Railroad", "Aviation", and "Food Sales" as information about the company name type. Frequently used term data 329 used by the company name type estimation 328 stores information about the terms frequently used in the description for each company name type.

Item value information 303 includes the item values of the items extracted by the specific information extraction unit 320.

A specific information search unit 330 adds extracted information based on the content of the item value information 303 by using preliminarily prepared information and external information services. The specific information search unit 330 holds the following functions and information.

Telephone number search 331 searches telephone number data 332 based on the item value of the telephone number of the item value information 303 to obtain a company name corresponding to the telephone number, and then performs processing to set the "Item Value" corresponding to the item name "Company Name". The telephone number data 332 is telephone number data on various company names which is created by digitalizing a telephone book. By searching the telephone number data 332, a company name that possesses the telephone number from telephone number information. The telephone number data 332 is generated in advance, stored in the external storage device 206 or the RAM 203, and copied to the RAM 203 and used as appropriate.

Item value information (after addition) 304 includes the item values of the items extracted by the specific information extraction unit 320, and the item values of the items searched and added by the specific information search unit 330.

A specific information correction unit 340 prompts the user to check the content of the item value information (after addition) 304 or correct errors to acquire a correct item value. The specific information correction unit 340 holds the following functions and information. "Item value check/correction by user" 341 is a portion for checking the item value and correcting errors by presenting the content of the item value information (after addition) 304 to the user. Document extracted information 305 is correct item value information on the extraction target obtained by the specific information correction unit 340.

A document extracted information utilization unit 350 is an apparatus, application, or service that utilizes the document extracted information 305. The document extracted information utilization unit 350 can be in various forms. Any apparatus, application, or service is applicable as long as it utilizes the document extracted information 305.

The above-described functions and processing flows are merely examples, and the present disclosure is not limited to thereto. In particularly, the above-described functions may be shared by a plurality of apparatuses, and the same processing may be distributed to and executed among a plurality of apparatuses.

FIG. 4 is a flowchart illustrating a flow of the overall processing.

In step S401, the image processing apparatus acquires a scan document image generated by scanning a document. This processing is equivalent to the processing for acquiring the scan document image 301 in FIG. 3.

In step S402, the image processing apparatus performs binarization processing to obtain an image suitable for character recognition. This processing is equivalent to the processing for generating a binary image by binalizing the scan document image 301 which is performed by the document image processing 311 of the document image analysis unit 310 in FIG. 3.

In step S403, the image processing apparatus detects ruled lines in the binary image and removes the ruled lines from the binary image to obtain an image with the ruled line removed so as to facilitate the execution of the character recognition processing. This processing is equivalent to the processing for detecting ruled lines in the binary image obtained as a result of the processing in step S402 by the document image processing 311 in FIG. 3, and replacing black pixel portions corresponding to the ruled lines with white pixels to generate the image without the ruled line.

In step S404, the image processing apparatus performs the character recognition processing on the image without the ruled lines to obtain the character string as a result of the character recognition. In this processing, the character recognition processing 312 in FIG. 3 performs the character recognition processing on the image obtained as a result of the ruled line removal processing in step S403. The character recognition result information 302 is thus generated based on the character string obtained as the character recognition result, the binary image obtained in steps S402 and S403, and the scan document image 301 obtained in step S401. The result of this processing will be described below with reference to the example of the form document 110 in FIG. 1B.

In step S405, the image processing apparatus performs document classification and processing for selecting an extraction target item. This processing is equivalent to the processing performed by the extracted item selection processing 321 on the character recognition result information 302 in FIG. 3 using the document classification data 322.

In step S406, the image processing apparatus identifies item name and item value candidates from the character recognition result for all of extraction target items. This processing is equivalent to the processing for searching for the item name and the corresponding item value for each of the extracted items in the character recognition result (the character recognition result information 302 in FIG. 3) obtained in step S404 using the item name/item value restriction data 324, which is performed by the item name/item value estimate processing 323 in FIG. 3. The likelihood for each of the searched item values is also calculated since there is a case where a plurality of item value candidates (character string candidates) is found for one extracted item (specific item name). In the item name search, character recognition errors may be corrected, and the descriptions using elliptical expressions or different notations and the values described in different formats may be uniformized. The result of this processing will be described below with reference to the example of the form document 110 in FIG. 1B.

In step S407, the image processing apparatus causes the specific information search unit 330 in FIG. 3 to perform searching using a specific item value candidate and add the item value of another item name. The processing in step S407 will be described in detail below with reference to the example of the form document 110 in FIG. 1B.

In step S408, the image processing apparatus corrects the item value based on an instruction of the user. This processing is equivalent to the processing performed by the "item value check/correction by user" 341 in FIG. 3 to present the character recognition result for all of the item values corrected in step S406 to the user and prompting the user to check or correct the content.

In step S409, the image processing apparatus outputs the extracted information and performs predetermined processing using the information. In this processing, the specific information correction unit 340 generates the document extracted information 305 in FIG. 3 and transfers the information to the document extracted information utilization unit 350, and the information is used by the document extracted information utilization unit 350. When the processing in step S409 is completed, the flowchart of the overall processing is ended.

Referring to FIG. 5A, each of the character recognition results includes the identifier (ID) of the character recognition result, the information about the position and size in the document image obtained by the character recognition result, and the character string obtained by the character recognition result. FIG. 5A illustrates an example of a result of the character recognition processing (step S406) performed on the receipt document as an example of the form document 110 in FIG. 1B. The character recognition result ID "T1" corresponds to the character recognition result for the text region 111 in FIG. 1B. Likewise, the character recognition result ID "T2" corresponds to the character recognition result for the text region 112. The character recognition result IDs "T3" to "T6" correspond to the character recognition results for the respective lines in the text region 113. The character recognition result ID "T7" corresponds to the character recognition result for the text region 114. The character recognition result ID "T8" corresponds to the character recognition result for the text region 115. The character recognition result ID "T10" corresponds to the character recognition result for the text region 116. Although not illustrated in the drawings, the character recognition result may include a plurality of candidates for a character or a character substring, and information about the positions and sizes of the candidates are included in the character recognition result. Each character string in the character recognition result in FIG. 5A indicates a maximum likelihood candidate among the candidates.

FIG. 5B illustrates examples of item name and item value restrictions on the extracted items to be used in the flow of processing in FIG. 4. The item name and item value restrictions are stored in the item name/item value restriction data 324 in FIG. 3 and are used in steps S406 and S407. The extracted item ID "E1" indicates the restriction on the extraction of the date information such as the date on which the receipt is issued. The extracted item ID "E2," indicates the restriction on the extraction of the telephone number. The extracted item ID "E3" indicates the restriction on the extraction of the total amount. Each item name/item value restriction includes the ID for identification, the extracted item name, the item name restriction, the item value restriction, and the relational restriction. These restrictions are predetermined based on the description format for each item.

Referring to FIG. 5B, the extracted item name indicates the content of each extracted item. The item name and item value restrictions describe conditions for searching for the description portions corresponding to the item name and item value in the character recognition result. For example, the item name restriction for the extracted item ID "E1" describes a condition for searching for the description portions corresponding to "Date of Issue" and "Date of Payment" in the character recognition result. Referring to FIG. 5B, the item value restrictions for the extracted item IDs "E1", "E2", and "E3" each specify a regular expression character pattern, i.e., a condition for searching for the description portion corresponding to each item in the character recognition result. For example, the item value restriction for the extracted item ID "E1" describes a character string pattern including a digit sequence followed by "Year", another digit sequence, "Month", yet another digit sequence, and "Day" in this order.

Referring to FIG. 5B, the relational restriction for the extracted item IDs "E1" and "E3" describes a restriction that the description portion corresponding to the item value for each extracted item is placed on the right of the description portion corresponding to the item name of the extracted item. This indicates the restriction on the relative positional relation of the description portions corresponding to the item name and item value in the scan document image 301. An item value that satisfies this restriction is used as the final extraction result. The relational restriction for the extracted item ID "E2" describes that, in addition to the relational restriction similar to that for the extracted item IDs "E1" and "E3", only the item value can be the final extraction result. However, in a case where only the item value is described, the restriction is placed secondly as the relational restriction, so that calculation is performed with the likelihood decreased. The relational restriction "Upper" indicates that the item is positioned in the upper portion of the scan document image 301 and the likelihood is relatively increased. The portions satisfying these specified search conditions in the character recognition are recognized as item value candidates.

FIGS. 5C and 5D illustrate examples of results of search on the item name and item value candidates (step S406) for the receipt document as an example of the form document 110 in FIG. 1B. FIG. 5C illustrates the item name candidates, and FIG. 5D illustrates the item value candidates.

FIG. 5C illustrates a result of search in the character recognition result according to the item name restrictions in FIG. 5B. Referring to FIG. 5C, each item name candidate includes the ID for identification of the item name candidate, the extracted item ID as a search condition for extracting the item name candidate, the character recognition result ID as a search target, the information about the position and size of the corresponding portion in the document image, and the character string as the character recognition result of the corresponding portion. The item name candidate ID "K1" indicates that the characters corresponding to the item name restriction "Date of Issue" for the extracted item ID "E1" as the date information are included in the character recognition result ID "T2". Similarly, "K2" and "K3" also specify in which character recognition result each item name is included.

FIG. 5D illustrates a result of search in the character recognition result according to the item value restrictions in FIG. 5B. Referring to FIG. 5D, each item value candidate includes the ID for identification of the item value candidate, the extracted item ID as a search condition for extracting the item value candidate, the character recognition result ID as a search target, the information about the position and size of the corresponding portion in the document image, and the character string as the character recognition result of the corresponding portion. The item value candidate ID "V1" indicates that the characters corresponding to the regular expression characters of the item value restriction for the extracted item ID "E1" as the date information are included in the character recognition result ID "T2". This also applies to the item value candidate IDs "V2", "V3", and "V4". Since the digit sequence corresponding to the model number of the ball-point pen 116 in FIG. 1B has a similar format to the predetermined format of the telephone number, the item value candidate ID "V3" is extracted.

In this way, the search for the item name and item value candidates is performed to obtain extraction results.

Figure 6:
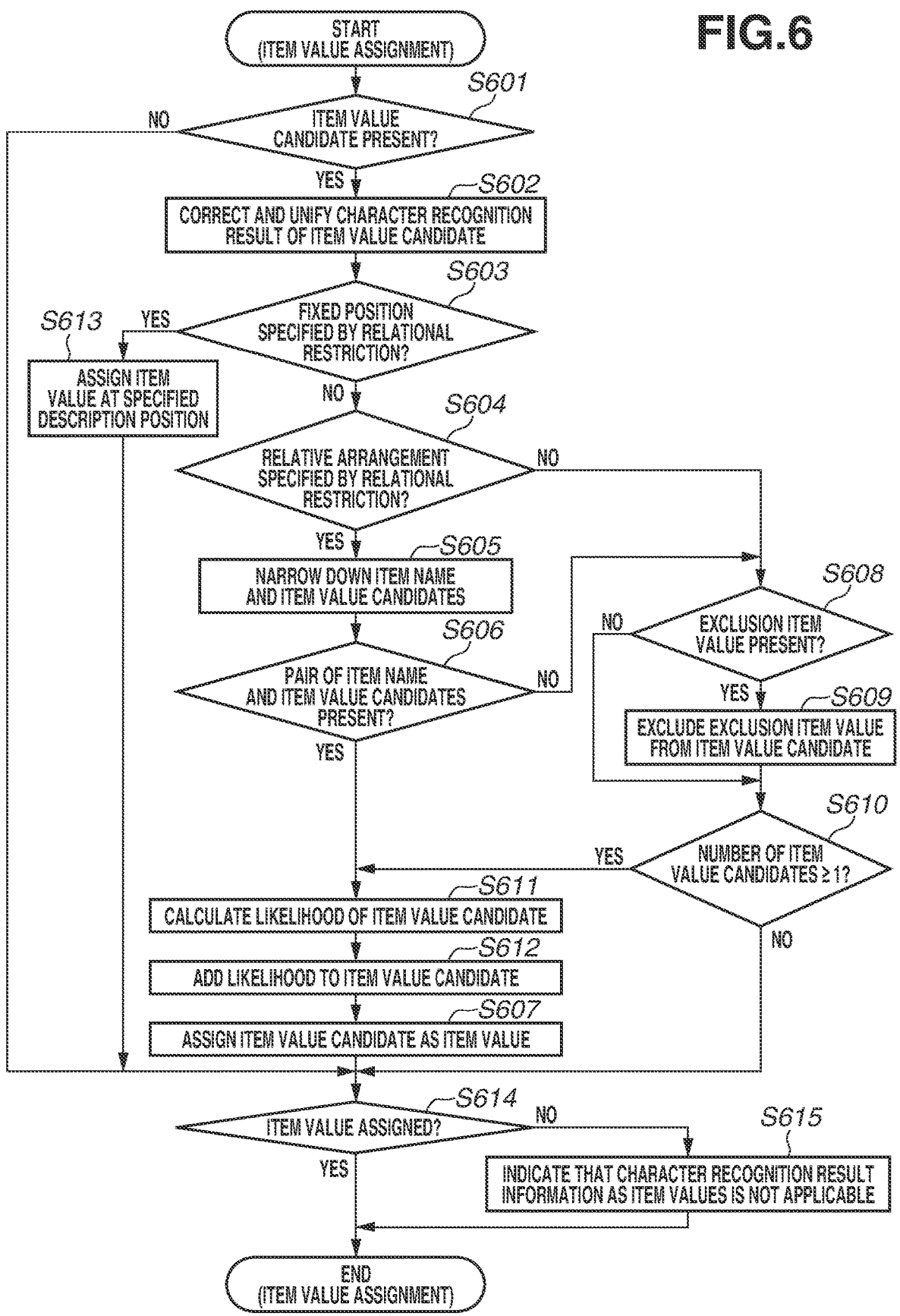
FIG. 6 illustrates a flow of item value extraction processing according to one or more aspects of the present disclosure.

FIG. 6 is a flowchart illustrating detailed processing of step S406 in FIG. 4, in which, based on information about the combination of the item value and item name candidates for all of the extracted items, an item value candidate is assigned to each extracted item. These extracted items are extracted items selected from the document classification result in step S405 in FIG. 4. This processing is performed for each extracted item. As a result, the character recognition result as the item value for each extracted item is identified, and the character recognition information on the item value is obtained for all of the extracted items. Item value extraction processing will be described below with reference to the flowchart in FIG. 6.

In step S601, the image processing apparatus determines whether an item value candidate is present for the extracted item. The image processing apparatus makes the determination in step S601 depending on whether item value candidate information (illustrated in FIG. 5D) obtained as a result of the processing in step S406 in FIG. 4 is present. When no item value candidate of the extracted item is present (NO in step S601), the processing proceeds to step S614. On the other hand, when an item value candidate is present (YES in step S601), the processing proceeds to step S602.

In step S602, the dictionary/character pattern collation processing 325 of the image processing apparatus performs processing of uniformizing the description formats, including correction of character recognition errors, and uniformization of the descriptions using elliptical expressions and different notations and the different description formats (character patterns) of values. The dictionary/character pattern collation processing 325 performs this processing for the character recognition results of all of the item value candidates of all items. The dictionary/character pattern collation processing 325 uniformizes the description formats using the character recognition error pattern dictionary 326 and the dictionary/character pattern data 327.

When a fixed position in the scan document image 301 (a specific position in the document, not illustrated in FIG. 5B) is specified by the relational restriction for the extracted item (FIG. 5B) (YES in step S603), the processing proceeds to step S613. On the other hand, when a relative arrangement is specified by the relational restriction for the extracted item or when no relational restriction is specified (NO in step S603), the processing proceeds to step S604.

In step S604, the image processing apparatus determines whether a relative arrangement of the item name and item value candidates is specified by the relational restriction for the extracted item (FIG. 5B). When a relative arrangement of the item name and item value candidates is specified by the relational restriction for the extracted item (FIG. 5B) (YES in step S604), the processing proceeds to step S605. On the other hand, when a relative arrangement is not specified (NO in step S604), the processing proceeds to step S608.

In step S605, the image processing apparatus selects one of the item value candidates of the extracted item and checks whether there is an item name that satisfies the relative arrangement restriction with each item value candidate. The image processing apparatus performs this processing for all of the item value candidates of the extracted items. As a result, the image processing apparatus performs processing for narrowing down to the item names that satisfy the relative arrangement restriction. As a result, a pair of item name and item value candidates that satisfy the relative arrangement restriction can be obtained. If a plurality of relative arrangement restrictions is present, the image processing apparatus will perform this processing for all of the restrictions. When the processing in step S605 is completed, the processing proceeds to step S606.

In step S606, the image processing apparatus determines whether a pair of item name and item value candidates is present as a result of the processing in step S605. When a pair of item name and item value candidates is present (YES in step S606), the processing proceeds to step S611. On the other hand, when no such a pair is present (NO in step S606), the processing proceeds to step S608.

In step S608, the image processing apparatus determines whether an exclusion item value is present in the extracted items.

If an exclusion item value is present (YES in step S608), the processing proceeds to step S609. On the other hand, when no exclusion item value is present (NO in step S608), the processing proceeds to step S610. An exclusion item value of the extracted item refers to a content that is not permitted to be extracted as an item value (e.g., classified information). Detailed descriptions thereof will be omitted since no such a value exists in the example in FIG. 1B.

After the image processing apparatus determines that an exclusion item value is present in the extracted item in step S608, the in step S609, the image processing apparatus performs processing for excluding item value candidates corresponding to the exclusion item value. When the processing in step S609 is completed, the processing proceeds to step S610.

In step S610, the image processing apparatus determines whether the number of item value candidates is equal to or larger than 1. When the number of item value candidates is 0 (i.e., no item value candidate is present) (NO in step S610), the processing proceeds to step S614. On the other hand, when the number of item value candidates is 1 or more (YES in step S610), the processing proceeds to step S611.

In step S611, the image processing apparatus performs processing for calculating the likelihood of each item value candidate to select an item value from among the plurality of item value candidates. In step S612, the image processing apparatus adds information about the likelihood calculated in step S611 to each of the plurality of item value candidates. The likelihood is determined based on the relational restriction in FIG. 5B. The processing in steps S611 and S612 will be described below with reference to the example in FIGS. 5A to 5D for the scan document image 301 in FIG. 1B. When the processing in step S612 is completed, the processing proceeds to step S607.

In step S607, the image processing apparatus assigns a pair of item name and item value candidates that remains or is narrowed down or the item value candidate as a result of the preceding processing, as the item value of the extracted item. When the processing in step S607 is completed, the processing proceeds to step S614.

The processing in step S605 is the processing for selecting the item value using the relative arrangement of the item name and item value candidates while the processing in steps S608 to S612 is the processing for selecting the item value from the item value candidate information when there is no item name candidate.

In a case where the fixed position in the scan document is specified by the relational restriction for the extracted item, the in step S613, the image processing apparatus assigns the character recognition result of the text corresponding to the fixed position as the item value of the extracted item. When the processing in step S613 is completed, the processing proceeds to step S614.

In step S614, the image processing apparatus determines whether the item value is assigned. When the item value is assigned (YES in step S614), the processing in the flowchart is ended. On the other hand, when no item value is assigned (NO in step S614), the processing proceeds to step S615.

In step S615, since the item value cannot be assigned, the image processing apparatus generates information indicating that there is no character recognition result information corresponding to the item value. When the processing in step S615 is completed, the processing in this flowchart is ended.

In this way, for the item name and item value candidates for all of the extracted items, the image processing apparatus performs processing for assigning the item value candidate for each extracted item based on information about combinations of these candidates.

FIG. 7 illustrates an example of a result of performing the processing in FIG. 6 on the receipt as the example of the form document image 110 in FIG. 1B based on the character recognition result and the item name and item value candidates in FIGS. 5A to 5D.

For the extracted item ID "E1", the item name candidate ID "K1" and the item value candidate ID "V1" are obtained as illustrated in FIGS. 5C and 5D, respectively. These candidates satisfy the specified relative position relation (the relational restriction used) (YES in steps S604, S605, and S606 in FIG. 6). In this case, the item value likelihood "High" is given to the item value candidate ID "V1" (steps S611 and S612 in FIG. 6). Likewise, for the extracted item ID "E4", the item name candidate ID "K4" and the item value candidate ID "V4" are obtained. These candidates satisfy the specified relative position relation (the relational restriction used) (YES in steps S604, S605, and S606 in FIG. 6). Also in this case, the item value likelihood "High" is given to the item value candidate ID "V4" (steps S611 and S612 in FIG. 6).

For the extracted item ID "E2," two different item value candidates are obtained. For one of them, the item name candidate ID "K2" and the item value candidate ID "V2" are obtained. These candidates satisfy the specified relative position relation (the relational restriction used) (YES in steps S604 to S606 in FIG. 6). In this case, the item value likelihood "High" is given to the item value candidate ID "V2" (steps S611 and S612 in FIG. 6). For the other item value candidate, no corresponding item name is present. Since only the item value candidate "V3" is obtained and only the item value is present, the image processing apparatus determines whether the item value is an exclusion item value (step S608 in FIG. 6). The item value candidate "V3" is obtained only based on the second item value, not the top one, of the relational restriction for "E2". In the receipt document as an example of the form document 110 in FIG. 1B, the position of the item value is the highest position (there is only one). Therefore, the item value likelihood "Middle" is given to the item value candidate ID "V3" (steps S611 and S612 in FIG. 6).

The character recognition result, and the item name candidate and item value candidates are obtained in this way.

Figure 8:
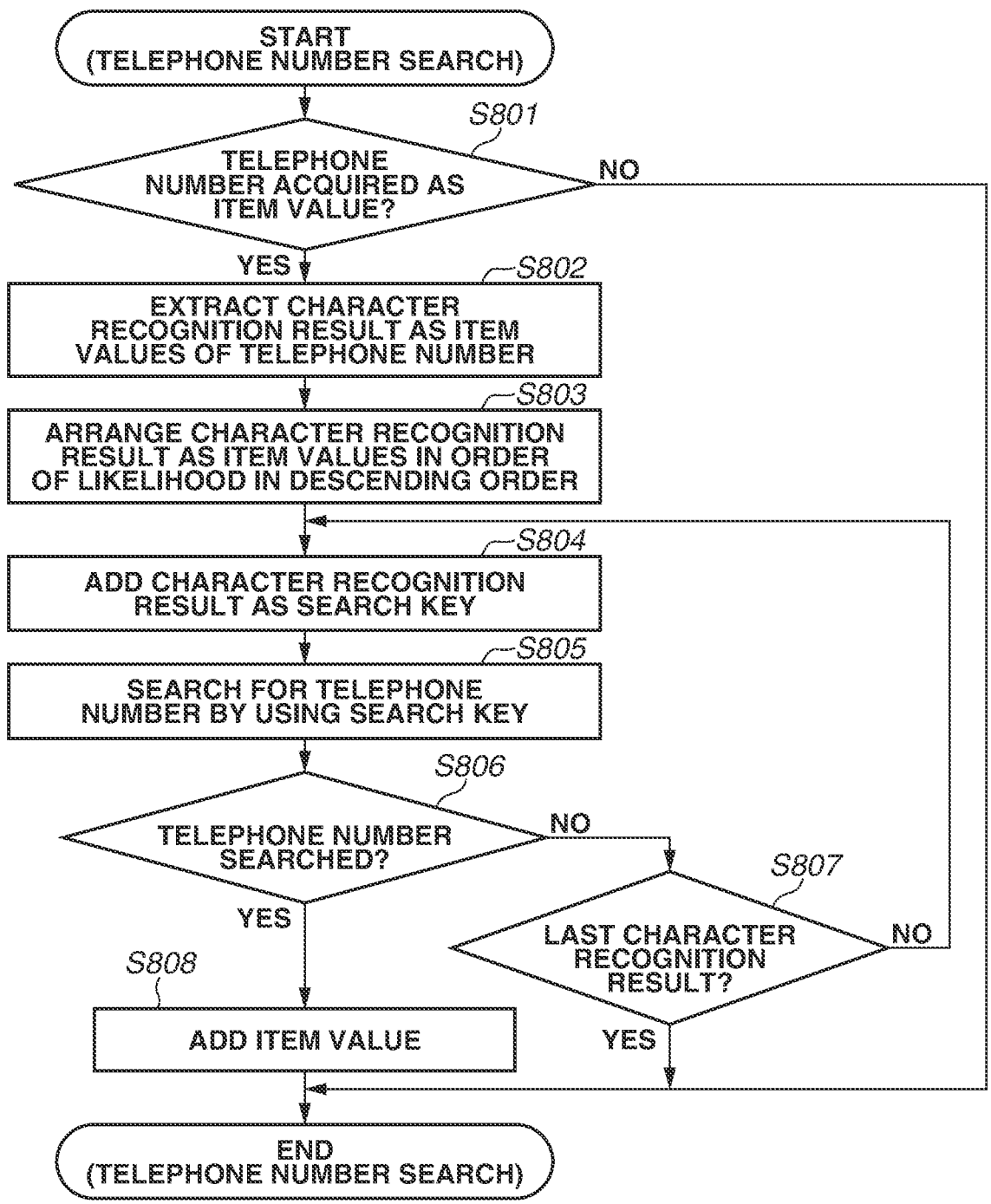
FIG. 8 illustrates a flow of telephone number search processing according to one or more aspects of the present disclosure.

FIG. 8 is a flowchart illustrating detailed processing in step S407 in FIG. 4, in which the search for the item value of the telephone number is performed to obtain the company name based on the item value of the telephone number, and the item name and the item value are added. As a result of this processing, the item value of the company name, i.e., the issuer, of the extracted item is added. These pieces of processing are performed by the dictionary/character pattern collation processing 325 in FIG. 3. The processing in the flowchart in FIG. 8 will be described below.

In step S801, the image processing apparatus determines whether a telephone number has been acquired as the item value. When the item value of the telephone number has been obtained in step S406 in FIG. 4 (a character string having the same format as the telephone number has been obtained) (YES in step S801), the processing proceeds to step S802. On the other hand, when no item value has been acquired (NO in step S801), the processing in this flowchart is ended.

In step S802, the image processing apparatus extracts the character recognition results as the item value of the telephone number obtained in step S406 in FIG. 4. The character recognition result in this case refers to the character recognition result as illustrated by "K2" in FIG. 5C, and is character string information indicating the telephone number. Hereinafter, this information is referred to as telephone number information.

In step S803, based on the likelihood information, the image processing apparatus arranges the item values obtained in step S802 in descending order of the likelihood to determine the order of subjecting the item values to the telephone number search. When the processing in step S803 is completed, the processing proceeds to step S804.

In step S804, the image processing apparatus sets the search target telephone number information as a search key according to the order determined in step S803.

In step S805, the image processing apparatus performs search processing based on the telephone number information set as a search key in step S804 to obtain the company name. This processing is equivalent to the processing performed by the telephone number search 331 in FIG. 3 for searching for the telephone number using the telephone number data 332. When the processing in step S805 is completed, the processing proceeds to step S806.

In step S806, the image processing apparatus determines whether the corresponding telephone number is found (i.e., whether the company name is obtained) in step S805. When the company name is obtained as a result of the processing in step S805 (YES in step S806), the processing proceeds to step S808. On the other hand, when no company name is obtained (NO in step S806), the processing proceeds to step S807.

In step S807, the image processing apparatus determines whether the telephone number information is the last telephone number information in the order of the telephone number information.

When the telephone number information is the last telephone number information (i.e., when the telephone number search processing is completed for all of the pieces of telephone number information) (YES in step S807), the processing in this flowchart is ended. On the other hand, when the telephone number information is not the last telephone number information (NO in step S807), the processing returns to step S804. Then, the image processing apparatus selects the next telephone number information and continues the processing.

In step S808, the image processing apparatus adds the company name obtained by the search using the telephone number information to the extracted item value. When the processing in step S808 is completed, the processing in this flowchart is ended.

According to the present exemplary embodiment, the image processing apparatus searches for the telephone number in descending order of the likelihood in the character recognition results (telephone number information) of the extracted item value to find the corresponding company name.

FIG. 9 illustrates an example of data including the obtained character recognition results and the item name and item value candidates illustrated in FIGS. 5A to 5D, and a result of performing the processing in FIG. 8, based on the image of the form document 110 in FIG. 1B.

The table illustrated in FIG. 9 includes the extraction result IDs "R1" to "R4" in addition to the content illustrated in the table in FIG. 7. The extraction result ID "D1" in FIG. 9 is added by the telephone number search in FIG. 8. For two pieces of telephone number information indicated by "E2" in FIG. 7, the telephone number search is performed in descending order of the likelihood (steps S803 to S805). As a result, the company name "AAA Office Machines" is found from the telephone number information for "V2" having higher likelihood and then added (step S808). In this way, the item value of the company name of the issuer of the document is added based on the described telephone number.

Figure 10:
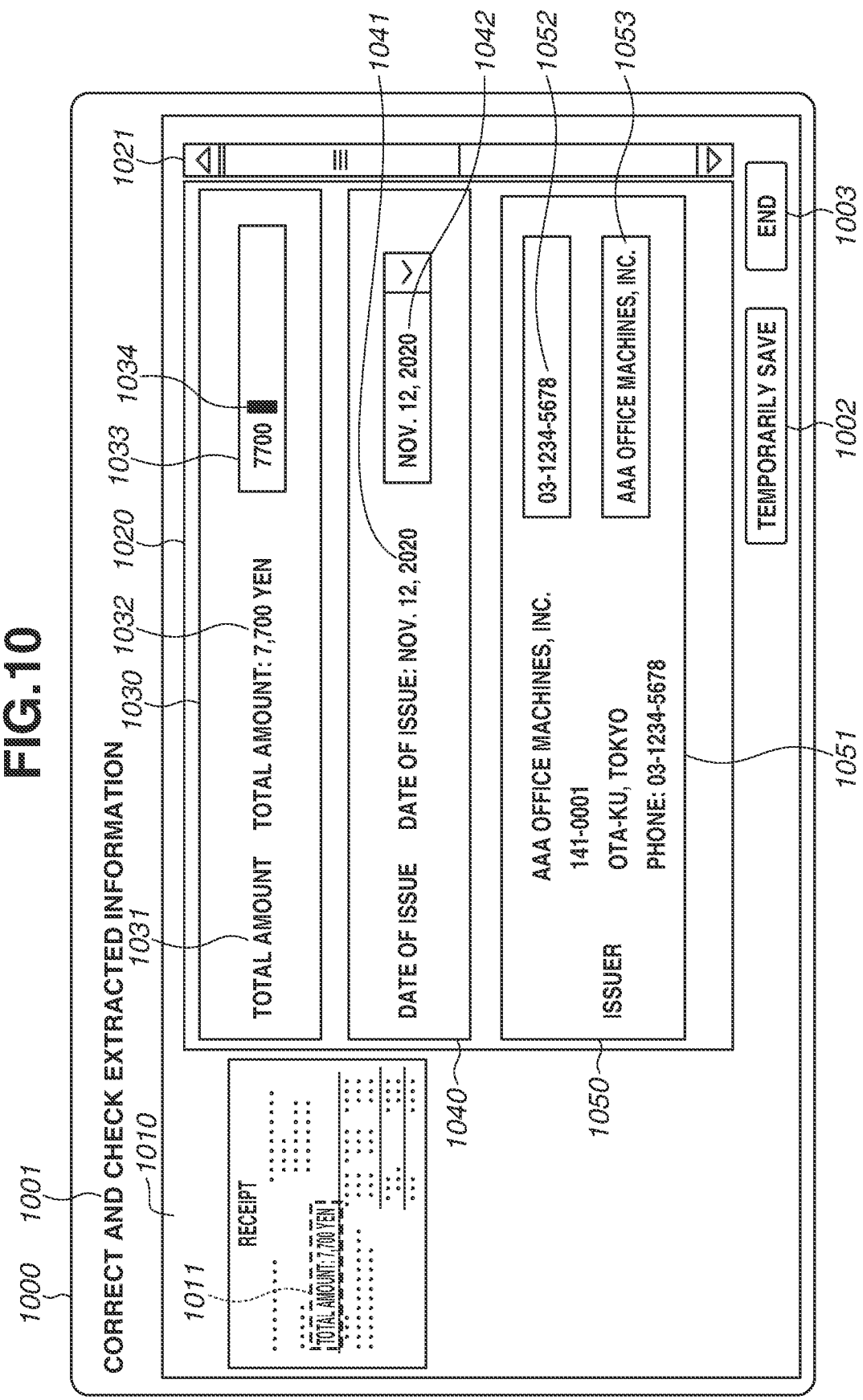
FIG. 10 illustrates a screen for checking and correcting an extraction result according to one or more aspects of the present disclosure.

FIG. 10 illustrates an example screen to be displayed in step S408 in FIG. 4 by the item value check/correction by user 341 of the specific information correction unit 340 in FIG. 3. The screen in FIG. 10 prompts the user to collate the character string of the item value (company name) added in step S407 in FIG. 4 with the receipt document as an example of the form document 110 in FIG. 1B to check whether correct values are extracted and correct errors.

A window 1000 configures the screen displayed in step S408 in FIG. 4. A window title 1001 indicates that this window is intended to correct and check the extracted item values (extracted information).

When a "Temporarily Save" button 1002 is pressed, the image processing apparatus temporarily stores the content of the operation currently being executed on the window 1000, temporarily ends the operation, and then closes the window 1000. Subsequently, the image processing apparatus restores the content of the operation to the window 1000 to enable the user to restart the operation.

When an End button 1003 is pressed, the image processing apparatus stores the content of the operation currently being executed on the window 1000 as a result of check work operation, ends the operation, and closes the window 1000.

A screen portion 1010 previews the entire scan image of the target form document, i.e., the entire image of the receipt document as an example of the form document 110 in FIG. 1B. A frame 1011 indicates the area corresponding to the target portion currently selected by a cursor operation (1034) of the user in the previewed scan image 1010.

A screen portion 1020 displays item values (1030, 1040, and 1050) of the extracted items obtained in step S407 in FIG. 4 to enable the user to check and correct the values.

A scroll bar 1021 is operated when there are many item values of the extracted items to be displayed so that all of them cannot be displayed within the screen portion 1020. The user operates the scroll bar 1021 to sequentially check all of the item values of the extracted items in the screen portion 1020.

Screen portions 1030 to 1050 display the item values of the extracted items to enable the user to check and correct the item values. A screen portion 1030 relates to the item value of the extracted item "Total Amount". A screen portion 1040 relates to the item value of the extracted item "Date of Issue". A screen portion 1050 relates to the item values "Telephone Number" and "Issuer".

A screen portion 1031 displays the name of the extracted item "Total Amount". Based on the information about the position and size in the document image stored in association with the character recognition result for the item value, a screen portion 1032 displays a partial image of the corresponding area clipped out from the image of the form document 110 in FIG. 1B. A screen portion 1033 displays the character string of the extracted item value to enable the user to check and correct the character string. The screen portion 1033 not only displays the character string itself but also enables the character string to be edited. When the user determines that the character string in the screen portion 1033 is wrong, the user can edit the character string. On the other hand, when the user confirms that the character string is correct, the user may leave the character string unchanged. Likewise, in the screen portion 1040, a screen portion 1041 displays a partial image for the item name "Date of Issue", and a screen portion 1042 displays the item value candidate in the editable state. Also, in the screen portion 1050, a screen portion 1051 displays a partial image, and screen portions 1052 and 1053 displays "Telephone Number" and "Company Name" of the issuer of the document, respectively, in the editable state.

Referring to FIG. 10, the user is currently selecting "Total Amount" in the screen portion 1030 with a cursor 1034 as the extracted item to be checked and corrected. Therefore, the screen portion 1030 is displayed with a thick frame that indicates the selected state. Accordingly, in the preview display displaying the image of the form document 110, the position of the portion corresponding to the partial image 1032 is displayed with the dotted-line frame 1011 in the highlighted state so that the user can easily check. The text cursor 1034 is displayed in the screen portion 1033 to enable the user to edit the character string of the item value of the extracted item "Total Amount", indicating that the character string is in the editable state. In this state, the user can check and correct the item value of the extracted item "Total Amount". At this time, the text cursor is not displayed in the screen portions 1042, 1052, and 1053 since they are not in the selected state.

In this way, the user can check and correct the item values for all of the extracted items by using the screen in FIG. 10.

As described above, according to the present exemplary embodiment, the image processing apparatus performs search and detection based on the result of character recognition to extract the item name and item value of the item that the user desires to extract from the document image. In this case, for the name (e.g., company name) of the document issuer, the image processing apparatus also searches for the company name based on the telephone number. More specifically, the image processing apparatus extracts a character string having a format corresponding to a telephone number from the document image based on the result of character recognition.

When a plurality of character strings determined to correspond to a telephone number is obtained, the image processing apparatus sets likelihood based on a frequently used telephone number description method, and performs the search processing on the character strings in descending order of the likelihood using the telephone number database and the telephone number service to find the company name. This increases the possibility that an appropriate company name is obtained even when a plurality of telephone number candidates is extracted. If no character string corresponding to a telephone number is extracted, the company name directly extracted from the character recognition result is displayed.

In this way, the image processing apparatus preferentially displays the company name identified based on the telephone number. When a plurality of telephone numbers is extracted, the image processing apparatus displays the company name based on the telephone number having the maximum likelihood. This method makes it possible to increase the probability that the correct company name of the issuer is displayed. As a result, the work efficiency of the user utilizing the information is improved and the work time is reduced, and at the same time, the work load on the person in charge of accounting is also reduced.

A second exemplary embodiment will be described below. As a method for preventing a digit sequence similar to a telephone number from being recognized as a telephone number, not only a condition that a telephone number is described on the right of such an item name as "PHONE" but also a method using description content that is likely to appear at the same time with a telephone number is also applicable. Since the telephone number is often described together with the company name and the company address on a document such as a receipt, in the second exemplary embodiment, a feature that the telephone number is described in the vicinity of the character strings of the company name and the company address is used.

FIG. 11A illustrates an example of a document image. Text regions 1101 to 1107 in FIG. 11A describe similar content to the text regions 111 to 117 in FIG. 1B, respectively. Like the text region 113 in FIG. 1B, the address and the telephone number are described below the company name "AAA Office Machines" in the text region 1103 in FIG. 11A. However, the text region 1103 is partially different from the text region 113. More specifically, the text region 113 in FIG. 1B is different from the text region 1103 in FIG. 11A in the description of the telephone number "03-1234-5678", i.e., the former includes the description of the item name "PHONE" but the latter does not. The second exemplary embodiment will be described below centering on a case where the processing similar to the in the first exemplary embodiment is performed on the text region 1103 in FIG. 11A without the description of the item name "PHONE".

FIG. 11B illustrates examples of item names and item value restrictions for the extracted items. These examples are similar to those in FIG. 5B. However, the examples in FIG. 11B include the item names and item value restrictions in FIG. 5B and additionally include item reference restrictions. More specifically, in FIG. 11B, the item reference restriction is used for the extracted item ID "E2". Like the first exemplary embodiment, these pieces of information are stored in the item name/item value restriction data 324 in FIG. 3 and used in steps S406 and S407 in FIG. 4. For the extracted item IDs "E1" and "E3" in FIG. 11B, no item reference restriction is specified, and the relational restriction does not include a restriction to use an item reference restriction. Therefore, processing identical to that according to the first exemplary embodiment will be performed.

For the extracted item ID "E2" in FIG. 11B, the use of a corporate status expression and an address expression is specified as an item reference restriction. A corporate name and a company name are often accompanied by a corporate status expression such as "Co., Ltd", "Inc.", and "School". Therefore, a condition that a character string including "Corporate Status Expression" exists in the vicinity of the telephone number candidate is specified. A condition that "Address Expression" includes a geographical name and an expression for the administrative identification, such as "Prefecture" and "City", indicating the company address is also specified. Information about such expressions is stored in the dictionary/character pattern data 327 in FIG. 3. The dictionary/character pattern collation processing 325 searches for a corresponding substring in character strings obtained as the result of character recognition.

For the extracted item ID "E2" in FIG. 11B, "Neighborhood ({item reference}, {item value})" corresponding to the above-described item reference restriction is added to the relational restriction. If, a character string obtained as the character recognition result corresponding to the item value restriction (telephone number format) exists in the vicinity of the character string corresponding to the above-described item reference restriction, the relational restriction is satisfied. As described in the first exemplary embodiment, the description order of the relational restrictions indicates the degree of the likelihood. Therefore, when the added relational restriction is applicable, the likelihood is "Middle". When the relational restriction specifies only the corresponding item value, the likelihood is "Low" unlike the first exemplary embodiment.

FIG. 11C illustrates examples of results of the search using an example of a document 1100 in FIG. 11A. More specifically, the image processing apparatus searches for the corresponding portion of the character string obtained as the character recognition result, which corresponds to the item reference restriction illustrated in FIG. 11B. Each result describes the identification information on the item reference ID, the information about the used extracted item ID, the information about the character recognition result ID including the corresponding portion, the information about the used item reference restriction, the information about the position and size in the document image, and the substring of the corresponding character recognition result. The result indicates that a substring of the character recognition result corresponding to "Corporate Status Expression" or "Address Expression" specified for the extracted item ID "E2" in FIG. 11B.

When the image processing apparatus performs the item value extraction processing in FIG. 6 by using the results in FIG. 11C, in the result of the extracted item ID "E2", a result of using the item name restriction cannot be generated. This is because the description "PHONE" is absent in the text region 1103 in FIG. 11A unlike the first exemplary embodiment. For this reason, "03-1234-5678", the item value candidate of the telephone number having the likelihood "High", is not generated. Instead, since the item reference ID "B2" in FIG. 11C exists in the vicinity, "03-1234-5678", the item value candidate of the telephone number having the likelihood "Middle", is generated. Since neither the corporate status expression nor the address expression exists (only the item value exists) in the vicinity of the item value candidate "045-555-1234", "045-555-1234", the item value candidate of the telephone number having the likelihood "Low", is generated.

FIG. 11D illustrates examples of results of performing the item value extraction processing in FIG. 6 using the results in FIG. 11C. The extraction result IDs "R1" and "R4" in FIG. 11D are identical to the extraction result IDs "R1" and "R4" in FIG. 9, respectively. For the extraction result ID "R2" in FIG. 11D, "03-1234-5678", the item value of the telephone number having the likelihood "Middle", is obtained since the item reference ID "B2" in FIG. 11C exists in the vicinity, as described above. Likewise, for the extraction result ID "R3" in FIG. 11D, "045-555-1234", the item value candidate of the telephone number having the likelihood "Low", is obtained since neither the corporate status expression nor the address expression exists (only the item value exists) in the vicinity. The extraction result ID "D1" in FIG. 11D is obtained from the extraction result ID "R2" in FIG. 11D as a result of the telephone number search in FIG. 8.

As described above, even when the item name of the telephone number is absent, by performing a search for a character string including a specific expression such as "Corporate Status Expression" or "Address Expression" in the character recognition result, the telephone number candidate having a high likelihood can be identified from among a plurality of telephone number candidates, thereby identifying the company name. The description has been given of a specific expression in the vicinity as an example. However, even when an image of a log or symbol indicating a specific company or an image indicating a specific address or region exists in the vicinity, similar effects can be produced by including the means of recognizing the image in the recognition function such as a character recognition function.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-177090, filed Oct. 29, 2021, which is hereby incorporated by reference herein in its entirety.

What is claimed is:

1. An image processing apparatus comprising:
a memory that stores instructions; and
a processor that executes the instructions to perform:
acquiring a character recognition result by performing character recognition processing on a document image;
detecting a character string candidate described in a predetermined format corresponding to a telephone number from the character recognition result;
determining a likelihood of the character string candidate to increase based on another character string existing in the vicinity of the detected character string candidate,
wherein the another character string indicates an item name of a telephone number; and
outputting an item value based on:
a character string candidate having a high likelihood, in a case where at least one character string candidate is determined to exceed a likelihood threshold; and
a character string from a different metadata field in the character recognition result, in a case where none of the character string candidates exceed the likelihood threshold.

2. The image processing apparatus according to claim 1, wherein, in a case where a plurality of candidates for a telephone number is detected, a search for a name corresponding to a candidate for a telephone number having a high likelihood is performed, and the name obtained by the search is output as the item value.

3. The image processing apparatus according to claim 2, wherein the name is a company name indicating an issuer of the document image.

4. The image processing apparatus according to claim 3, wherein, in a case where no candidate for a telephone number is detected, a company name detected from the character recognition result is output.

5. The image processing apparatus according to claim 1, wherein the likelihood of the character string candidate is determined to increase the likelihood of the detected character string candidate in the vicinity of which a character string of a predetermined item name exists.

6. The image processing apparatus according to claim 1, wherein the output item value is information about an issuer of the document image.

7. The image processing apparatus according to claim 1, wherein an item value corresponding to at least one of a total amount and a date of issue extracted from the character recognition result is output.

8. An image processing method comprising:
acquiring a character recognition result by performing character recognition processing on g a document image;
detecting a character string candidate described in a predetermined format corresponding to a telephone number from the character recognition result;
determining a likelihood of the character string candidate to increase based on another character string existing in the vicinity of the detected character string candidate,
wherein the another character string indicates an item name of a telephone number; and
outputting an item value based on:
a character string candidate having a high likelihood, in a case where at least one character string candidate is determined to exceed a likelihood threshold; and
a character string from a different metadata field in the character recognition result, in a case where none of the character string candidates exceed the likelihood threshold.

9. A non-transitory computer-readable storage medium that stores a program, wherein the program causes a processor to perform:
acquiring a character recognition result by performing character recognition processing on a document image;
detecting a character string candidate described in a predetermined format corresponding to a telephone number from the character recognition result;
determining a likelihood of the character string candidate to increase based on another character string existing in the vicinity of the detected character string candidate,
wherein the another character string indicates an item name of a telephone number; and
outputting an item value based on:
a character string candidate having a high likelihood, in a case where at least one character string candidate is determined to exceed a likelihood threshold; and
a character string from a different metadata field in the character recognition result, in a case where none of the character string candidates exceed the likelihood threshold.

* * * * *